(12) United States Patent
Agon et al.

(10) Patent No.: US 12,371,065 B2
(45) Date of Patent: Jul. 29, 2025

(54) SYSTEMS AND METHODS FOR CONFIGURING AUTONOMOUS VEHICLE OPERATION

(71) Applicant: Lyft, Inc., San Francisco, CA (US)

(72) Inventors: Alan Agon, Sunnyvale, CA (US); Nastaran Ghadar, Pleasanton, CA (US); Yunjian Jiang, San Jose, CA (US); Mason Lee, Sunnyvale, CA (US); Carlos Alberto De Magalhaes Massera Filho, Mountain View, CA (US); Carey Stover Nachenberg, Manhattan Beach, CA (US); Sammy Omari, Los Altos, CA (US); Ana Sofia Rufino Ferreira, Berkeley, CA (US); Meng Tao, Redwood City, CA (US)

(73) Assignee: Lyft, Inc., San Francisco, CA (US)

( * ) Notice: Subject to any disclaimer, the term of this patent is extended or adjusted under 35 U.S.C. 154(b) by 927 days.

(21) Appl. No.: 17/073,657

(22) Filed: Oct. 19, 2020

(65) Prior Publication Data
US 2022/0119012 A1    Apr. 21, 2022

(51) Int. Cl.
| | |
|---|---|
| *B60W 60/00* | (2020.01) |
| *B60W 30/09* | (2012.01) |
| *B60W 30/095* | (2012.01) |
| *G06V 20/56* | (2022.01) |

(52) U.S. Cl.
CPC ........ *B60W 60/0027* (2020.02); *B60W 30/09* (2013.01); *B60W 30/0956* (2013.01); *G06V 20/56* (2022.01); *B60W 2420/40* (2013.01); *B60W 2420/403* (2013.01); *B60W 2420/408* (2024.01); *B60W 2420/54* (2013.01); *B60W 2554/4026* (2020.02); *B60W 2554/4029* (2020.02); *B60W 2554/4041* (2020.02)

(58) Field of Classification Search
CPC ............ B60W 60/0027; B60W 30/09; B60W 30/0956; G06V 20/58
See application file for complete search history.

(56) References Cited

U.S. PATENT DOCUMENTS

| | | | | |
|---|---|---|---|---|
| 11,353,878 | B2 * | 6/2022 | Zhu .................. | B60W 30/0956 |
| 2016/0300485 | A1 * | 10/2016 | Ayvaci .................. | G08G 1/166 |
| 2017/0316333 | A1 * | 11/2017 | Levinson ............... | G06N 20/00 |
| 2019/0263398 | A1 * | 8/2019 | Matsunaga .......... | G05D 1/0088 |
| 2020/0047747 | A1 * | 2/2020 | An ........................ | B60W 10/20 |
| 2020/0086863 | A1 * | 3/2020 | Rosman ................ | G06V 20/58 |
| 2020/0180647 | A1 * | 6/2020 | Anthony ........... | B60W 50/0097 |

* cited by examiner

*Primary Examiner* — Jelani A Smith
*Assistant Examiner* — Toya Pettiegrew
(74) *Attorney, Agent, or Firm* — Sheppard Mullin Richter & Hampton LLP

(57) ABSTRACT

Systems, methods, and non-transitory computer-readable media can detect an occurrence of a condition in an environment based on sensor data captured by a vehicle. A determination is made whether the occurrence of the condition satisfies a threshold associated with a likelihood that a behavior associated with an object in the environment will occur based on an interaction between the condition and the object, wherein the likelihood is based on prior observations of one or more objects. Subsequent to determining that the threshold is satisfied, a vehicle operation that is associated with the likelihood that the behavior associated with the object will occur is performed.

18 Claims, 14 Drawing Sheets

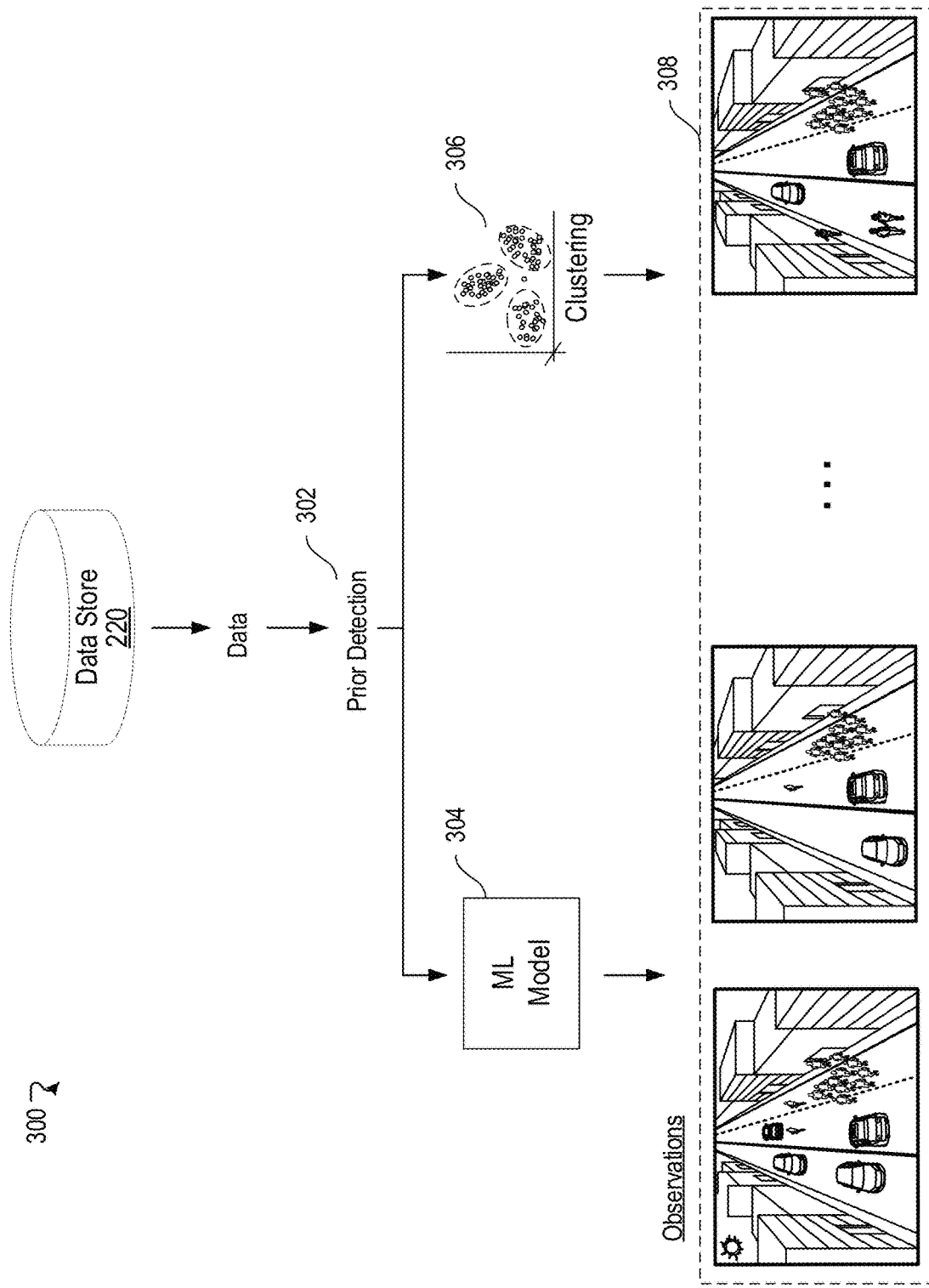

SYSTEMS AND METHODS FOR CONFIGURING AUTONOMOUS VEHICLE OPERATION

FIELD OF THE INVENTION

The present technology relates to autonomous vehicle systems. More particularly, the present technology relates to configuring autonomous vehicle behavior.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have sensors that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to detect an occurrence of a condition in an environment based on sensor data captured by a vehicle. A determination is made whether the occurrence of the condition satisfies a threshold associated with a likelihood that a behavior associated with an object in the environment will occur based on an interaction between the condition and the object, wherein the likelihood is based on prior observations of one or more objects. Subsequent to determining that the threshold is satisfied, a vehicle operation that is associated with the likelihood that the behavior associated with the object will occur is performed.

In an embodiment, determining whether the occurrence of the condition satisfies the threshold comprises: referencing a semantic map associated with the environment, wherein the semantic map includes at least a priors layer that encodes information describing the condition and the likelihood that the behavior associated with the object will occur.

In an embodiment, the condition corresponds to an occurrence of at least one of an object or an event within the environment, and wherein the occurrence of the at least one object or event within the environment is associated with the likelihood that the behavior associated with the object will occur.

In an embodiment, performing the vehicle operation comprises: reconfiguring a perception component of the autonomy stack associated with the vehicle, wherein reconfiguring the perception component changes at least one operation performed by the perception component with respect to the object based on the likelihood that the behavior associated with the object will occur.

In an embodiment, reconfiguring the perception component causes the perception component to at least one of increase or decrease a range of perception for sensors associated with the vehicle, expand perception processing to focus on an area of interest, change a perception model implemented by the perception component, change model parameters for a perception model implemented by the perception component, change an object classification model implemented by the perception component, activate or deactivate one or more sensors, or reallocate on-board resources associated with the perception component.

In an embodiment, performing the vehicle operation comprises: reconfiguring a prediction component of the autonomy stack associated with the vehicle, wherein reconfiguring the prediction component changes at least one operation performed by the prediction component with respect to the object in the environment based on the likelihood that the behavior associated with the object will occur.

In an embodiment, reconfiguring the prediction component causes the prediction component to apply a specialized prediction model to predict a location and movement of the object instead of a generalized prediction model.

In an embodiment, performing the vehicle operation comprises: reconfiguring a planning component of the autonomy stack associated with the vehicle, wherein reconfiguring the planning component changes at least one trajectory to be performed by the planning component based on the likelihood that the behavior associated with the object will occur.

In an embodiment, the systems, methods, and non-transitory computer readable media are further configured to determine a plurality of probabilities that the behavior associated with the object in the environment will occur based on an interaction between the object and one or more conditions detected by a sensor of the vehicle; and determine the likelihood that the behavior associated with the object will occur based on an interaction between the condition and the object based on a highest probability from the plurality of probabilities.

In an embodiment, the prior observations of the one or more objects are captured by sensors of one or more vehicles that navigated the environment, and wherein the object is at least similar to the one or more objects, and a prior observation is associated with an interaction between the one or more objects and at least the condition.

BRIEF DESCRIPTION OF THE DRAWINGS

FIGS. 3A-3D illustrate example implementations of conditional priors, according to an embodiment of the present technology.

Figure 1A:
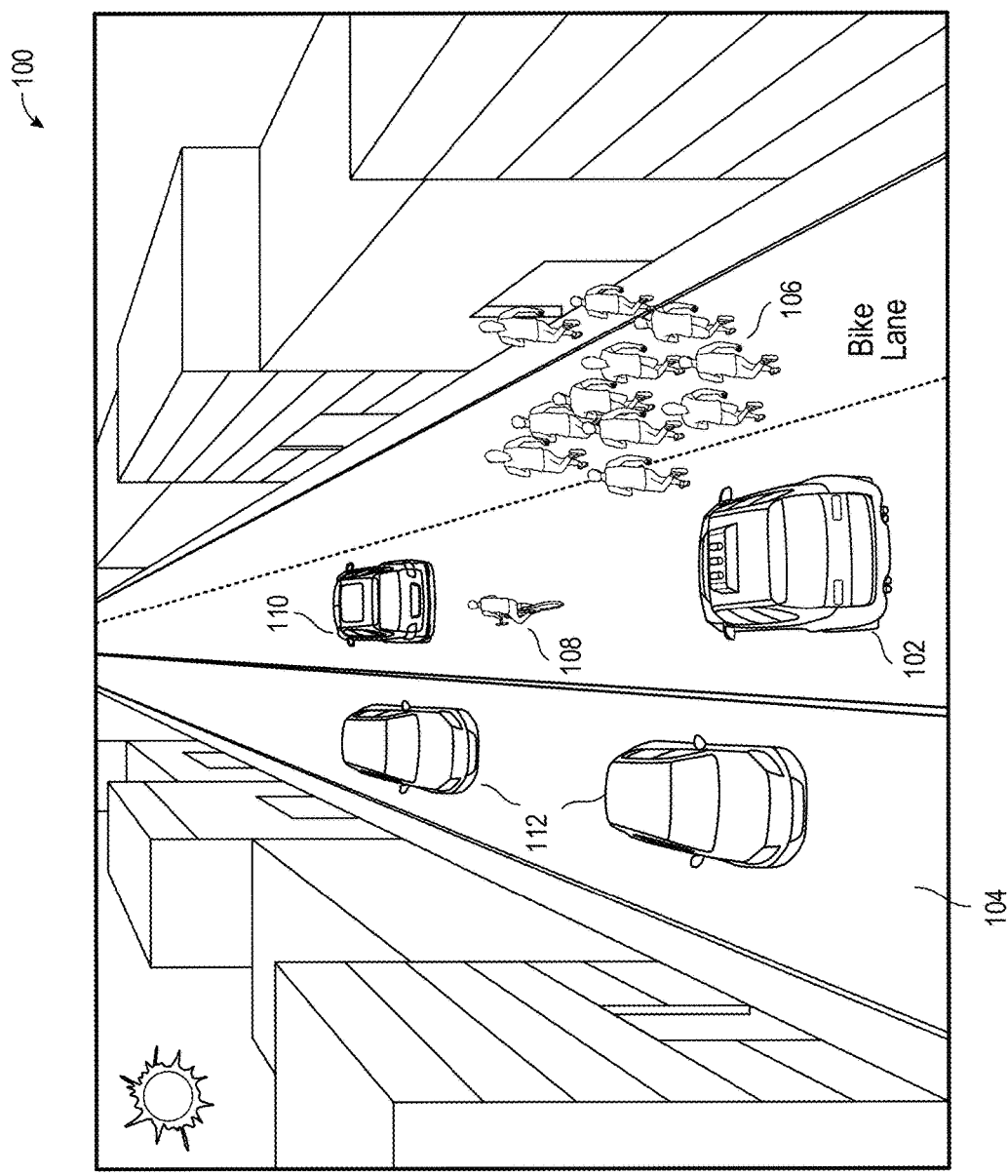
FIGS. 1A-1B illustrate example challenges that may be experienced under conventional approaches

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, the vehicle may have one or more sensors or sensor systems that can recognize hazards, roads, lane markings, traffic signals, etc. Data from sensors may be used to, for example, safely drive the vehicle, activate certain safety features (e.g., automatic braking), and generate alerts about potential hazards.

A computing system associated with a vehicle can process data from sensors to perform operations related to controlling the vehicle's operation. The computing system can be supported by an autonomy stack that includes a perception component to perform perception-related operations, a prediction component to perform prediction-related operations, and a planning component to perform planning-related operations, among others. The perception-related operations can be supported by a perception model generally trained to identify locations and types of objects detected in an environment, such as pedestrians and vehicles. The prediction-related operations can be supported by a prediction model generally trained to predict future locations or movement (e.g., trajectories) of detected objects. Further, the planning-related operations can be supported by a planning model generally trained to determine paths for a vehicle to follow, for example, based on the perception- and prediction-related operations. Thus, as the vehicle navigates an environment, the computing system constantly analyzes vast amounts of sensor data to identify objects and their locations in the environment. The computing system can also predict future locations and movement of the identified objects. The computing system can then plan paths to safely navigate the vehicle in the environment in view of the identified objects and their predicted trajectories. Under this approach, the computing system constantly senses and reacts to its environment to allow safe navigation of the vehicle. However, having to analyze and react to vast amounts of sensor data on-the-fly can dramatically increase driving complexity and computational burden on on-board resources.

FIG. 1A illustrates an example environment 100 in which a vehicle 102 is shown navigating a road 104. The vehicle 102 may be equipped with one or more sensors that can capture environmental information, such as information describing the road 104 and objects present on or along the road 104. For example, in some instances, the vehicle 102 may be equipped with one or more sensors in a sensor suite including optical cameras, LiDAR, radar, infrared cameras, and ultrasound equipment, to name some examples. Such sensors can be used to collect information that can be used by the vehicle 102 to understand its environment and objects within the environment. Under conventional approaches, a computing system associated with the vehicle 102 can apply an autonomy stack to perform operations relating to perception, prediction, and planning, among others. The computing system can perceive and interpret features and combinations of features detected from sensor data, such as static objects (e.g., building, trees, fire hydrant, crosswalk, etc.) and dynamic objects (e.g., pedestrians, vehicles, etc.) within the environment 100. The computing system can apply perception-related operations to determine the presence of, for example, the road 104, a group of joggers 106, a bicyclist 108, a passenger vehicle 110 driving in front of the vehicle 102, and passenger vehicles 112 driving in an opposing lane. The computing system can also perform prediction-related operations with respect to each of the identified objects to predict their future locations or movement (e.g., trajectories). Finally, the computing system can perform planning-related operations to safely navigate the vehicle 102. For instance, the computing system can plan a safe path for the vehicle 102 to avoid objects, such as the group of joggers 106 and the bicyclist 108. However, despite these operations of the computing system, the safe path planned for the vehicle 102 can suddenly become unsafe due to rapidly occurring changes in real-world driving environments.

Figure 1B:
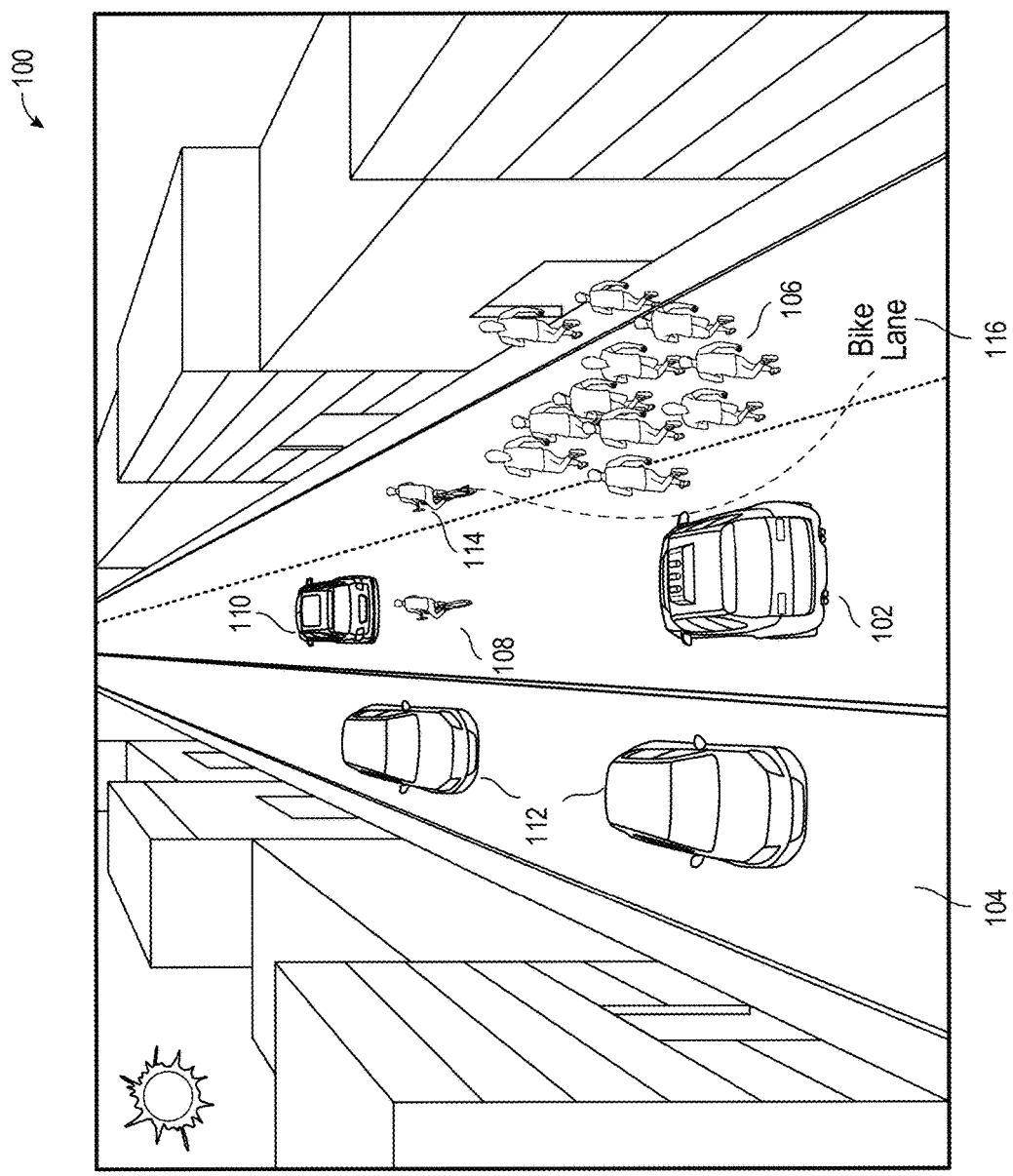

FIG. 1B illustrates the example environment 100 with the presence of a bicyclist 114. In this example, the bicyclist 114 has unexpectedly swerved out of a bike lane 116 to maneuver around the group of joggers 106 that is blocking the bike lane 116. As a result, the computing system associated with the vehicle 102 must take immediate measures to avoid the bicyclist 114 and again plan a safe path for the vehicle 102 while accounting for changes to the respective trajectories of the group of joggers 106, the bicyclist 108, the passenger vehicle 110 driving in front of the vehicle 102, and the passenger vehicles 112 driving in the opposing lane. The need to constantly sense and react to a changing environment on-the-fly can increase driving complexity and strain computational resources associated with the vehicle 102. Additionally, having to make abrupt changes to a path planned for the vehicle 102 can result in sudden braking or changes to vehicle direction, speed, and acceleration, which can degrade a comfort level of passengers riding in the vehicle 102. Instead, it would be advantageous if the computing system associated with the vehicle 102 were able to predict or determine certain behavior that is likely to be experienced while driving on the road 104, and proactively take measures in anticipation of that behavior. By proactively taking measures in view of the anticipated behavior, the vehicle 102 can reduce driving complexity while intelligently allocating its valuable on-board resources to improve driving safety and comfort. Accordingly, innovative technologies are needed to help vehicles anticipate and proactively respond to behavior that may be experienced while navigating an environment.

Figure 1C:
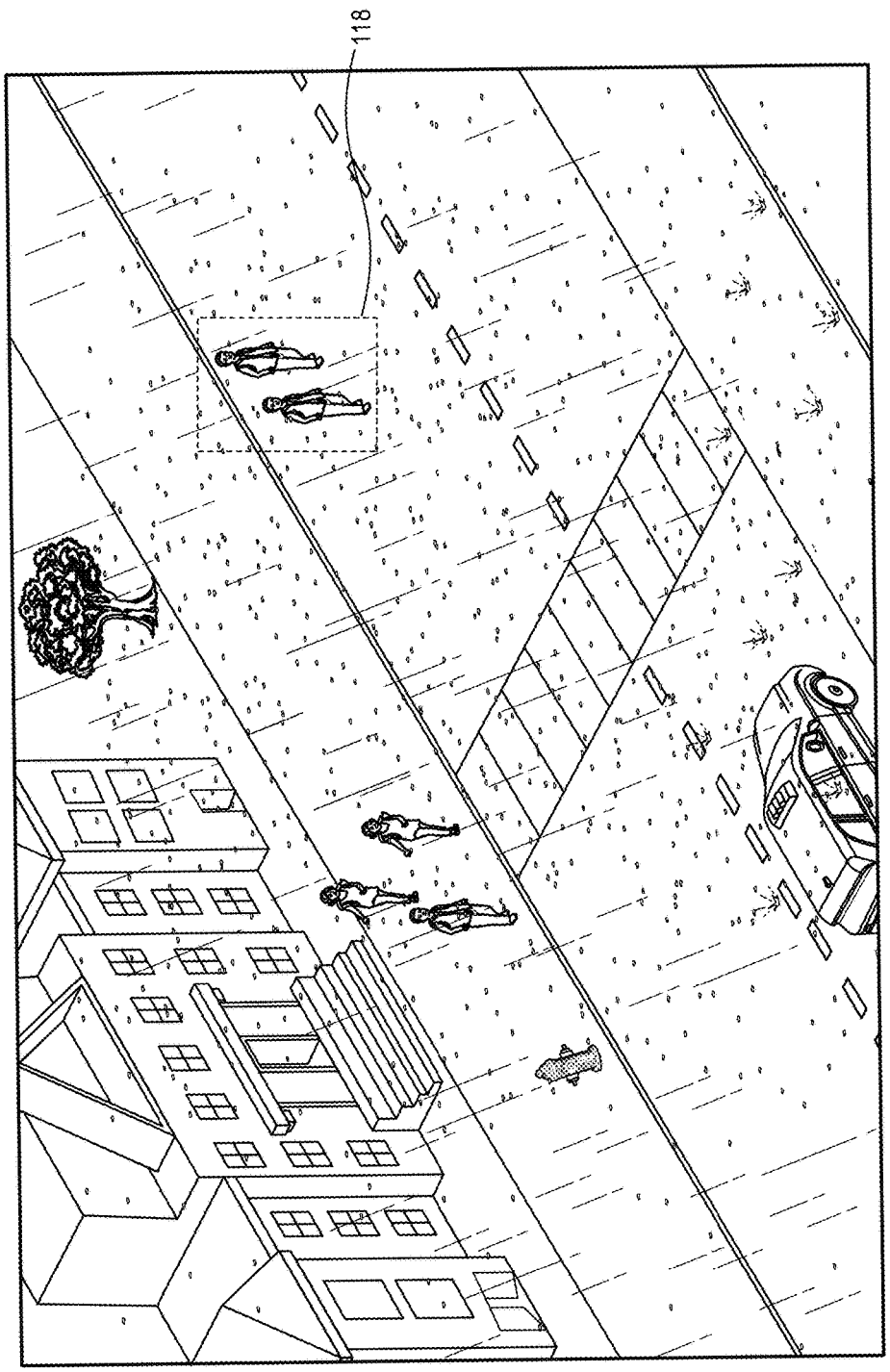
FIGS. 1C-1E illustrate improvements to conventional approaches, according to an embodiment of the present technology.

An improved approach in accordance with the present technology overcomes the foregoing and other disadvantages associated with conventional approaches. In various embodiments of the present technology, a computing system associated with a vehicle can predict or determine various patterns of behavior that are likely to be experienced when navigating an environment based on conditional priors. A conditional prior can be associated with a known or predefined type of pattern, activity, phenomenon, situation, or other behavior having a threshold likelihood of occurring when one or more conditions are satisfied. For example, a conditional prior can be associated with a jaywalking pattern 118 with a threshold likelihood of occurring when a vehicle is navigating a school zone under certain weather conditions (e.g., rain, snow, etc.), as illustrated in the example of FIG. 1C. The conditional prior can also be associated with vehicle operations that can be performed in response to satisfaction of the conditions indicating a threshold likelihood of occurrence of the related scenario. In the foregoing example, the conditional prior can be associated with vehicle operations that can be performed when conditions associated with the jaywalking scenario are satisfied. For example, the conditional prior can be associated with instructions for modifying components of a generalized autonomy stack, as implemented by a computing system associated with a vehicle. For instance, the generalized autonomy stack can be reconfigured to perform specialized perception-related operations, specialized prediction-related operations, or specialized planning-related operations given the threshold likelihood of the vehicle encountering the jaywalking scenario.

Figure 1D:
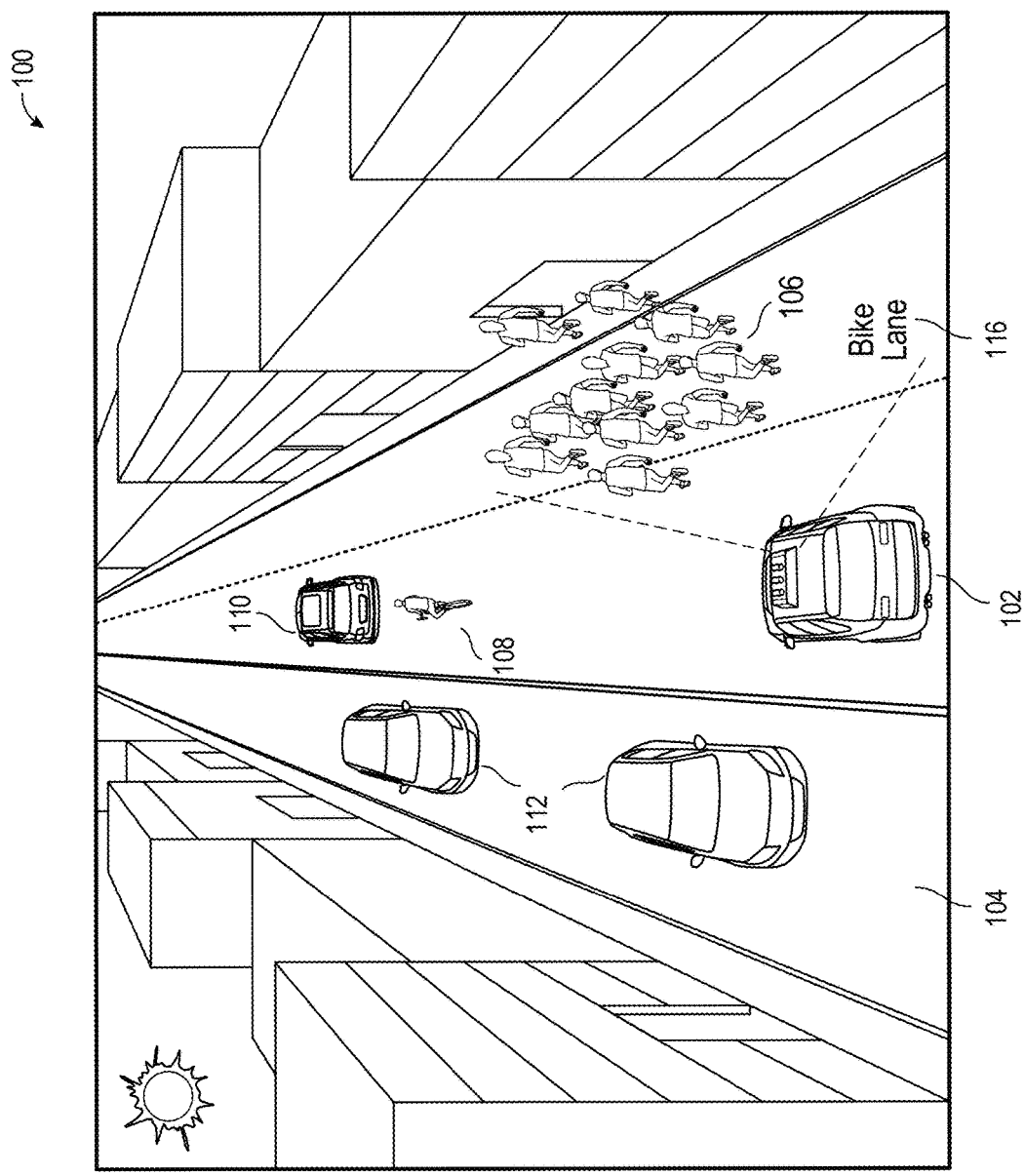

FIG. 1D illustrates a vehicle operation that can be performed in response to determination of a conditional prior, according to an embodiment of the present technology. In the example of FIG. 1D, while navigating the road 104, the vehicle 102 determines that a set of conditions associated with a conditional prior is satisfied. For example, determination of a conditional prior can be associated with a threshold likelihood of encountering the group of joggers 106 in the bike lane 116 when navigating the road 104 on weekdays between 11:30 am and 1:30 μm. In this example, the vehicle 102 is driving on the road 104 on a weekday between 11:30 am and 1:30 pm. As a result, the computing system associated with the vehicle 102 can determine there is a threshold likelihood of encountering the group of joggers 106 in the bike lane 116. The conditional prior can also be associated with instructions for performing one or more vehicle operations when conditions associated with the conditional prior satisfy the threshold likelihood. For example, the instructions can modify operations performed by a perception component (or system), a prediction component, or a planning component associated with an autonomy stack implemented by the computing system associated with the vehicle 102. In the example of FIG. 1D, the computing system can modify the operations performed by the components of the autonomy stack by, for example, allocating additional on-board resources (e.g., cameras, computing resources, etc.) to monitor the bike lane 116 for joggers. As a result, the vehicle 102 can predict or determine a potential encounter with the group of joggers 106 before actually encountering the group of joggers 106. Further, the vehicle 102 can proactively perform various operations to optimize driving safety, passenger comfort, and allocation of on-board resources given the threshold likelihood of encountering the group of joggers 106.

Figure 1E:
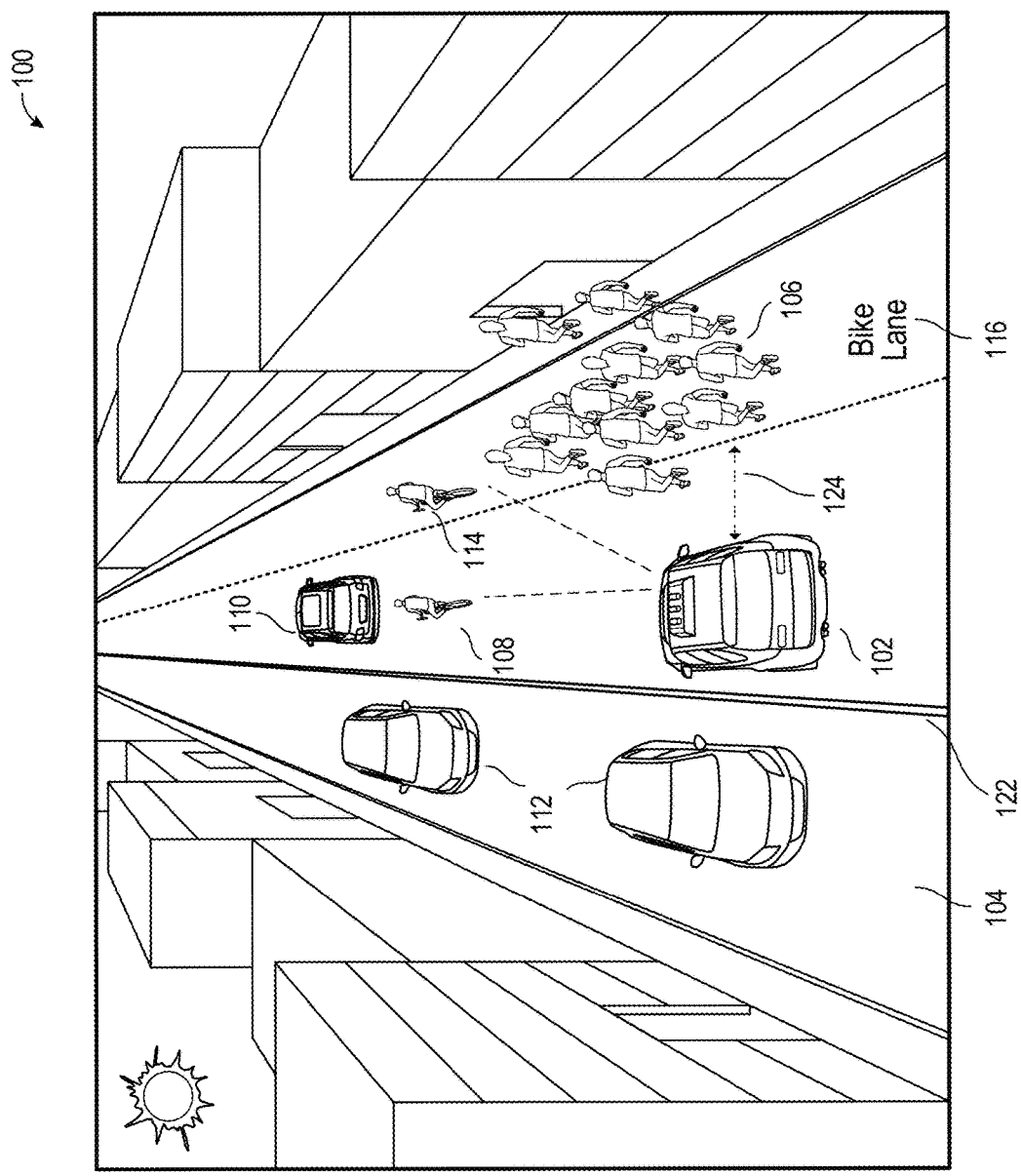

FIG. 1E illustrates additional vehicle operations that can be performed upon satisfaction of conditions associated with a conditional prior, according to an embodiment of the present technology. In the example of FIG. 1E, the vehicle 102 determines that a set of conditions associated with another conditional prior is satisfied. For example, the conditional prior can be associated with a threshold likelihood of encountering bicyclists that swerve outside of the bike lane 116 when the group of joggers 106 is present in the bike lane 116. In this example, the vehicle 102 has perceived the group of joggers 106 in the bike lane 116. Based on satisfaction of these conditions, the computing system associated with the vehicle 102 can determine there is a threshold likelihood of encountering a bicyclist that swerves outside of the bike lane 116. The conditional prior can also be associated with instructions for performing one or more vehicle operations when conditions associated with the conditional prior are satisfied. For example, in FIG. 1E, based on instructions associated with the conditional prior, the computing system causes the vehicle 102 to modify operations performed by its perception component, prediction component, planning component, or a combination thereof, to increase a lateral distance 124 between the vehicle 102 and the bike lane 116 by driving closer to a median strip 122 of the road 104, which allows more room for bicyclists to maneuver around the group of joggers 106. Additionally, based on instructions associated with the conditional prior, the computing system can alter the prediction component of the autonomy stack to apply a specialized prediction model that is trained to predict trajectories of bicyclists. Many variations are possible.

Advantageously, determinations of conditional priors allow vehicles navigating a region to anticipate behavior that is likely to be encountered. Determinations of conditional priors also allow the vehicles to proactively modify vehicle operations in anticipation of the behavior that is likely to be encountered, thereby improving driving safety, passenger comfort, and intelligent allocation of on-board resources. More details relating to the present technology are provided below.

Figure 2:
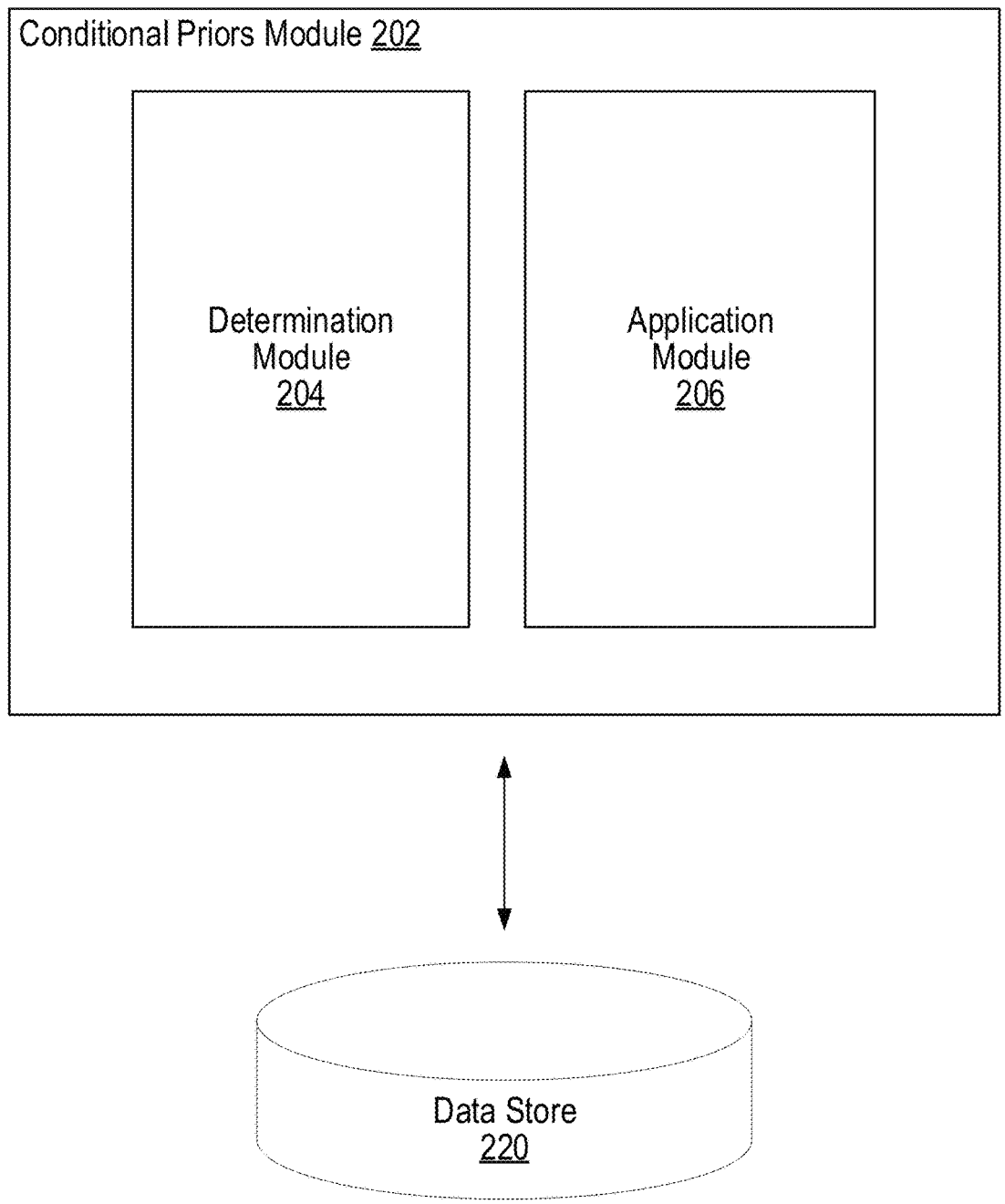
FIG. 2 illustrates an example environment including a conditional priors module, according to an embodiment of the present technology.

FIG. 2 illustrates an example system 200 including an example conditional priors module 202, according to an embodiment of the present technology. As shown, the conditional priors module 202 can include a determination module 204 and an application module 206.

The conditional priors module 202 can be configured to communicate and operate with at least one data store 220 that is accessible to the conditional priors module 202. The data store 220 can be configured to store and maintain various types of data that can be analyzed to identify conditional priors and to determine actions to be performed in response to identification of the conditional priors. For example, the data store 220 can store data which includes sensor data collected by sensors of a fleet of vehicles from various sources and geographic locations. Sensor data may be collected by, for example, sensors mounted to the vehicles themselves and/or sensors on computing devices associated with users riding within the fleet of vehicles (e.g., user mobile devices). For example, a mobile phone placed inside of a vehicle may include integrated sensors (e.g., a global positioning system (GPS), optical camera, compass, gyroscope(s), accelerometer(s), and inertial measurement unit(s)) which can be used to capture information. The data store 220 can store associations between conditions and corresponding conditional priors as well as associations between conditional priors and corresponding actions to perform in response to determination of the conditional priors. The data store 220 can also store types of data, including pick-up and drop-off location history, surge information (e.g., gaps in supply and demand), and event data (e.g., concert times, holidays, etc.). In some embodiments, some or all data stored in the data store 220 can be stored by the vehicle 640 of FIG. 6. In some embodiments, some or all of the functionality performed by the conditional priors module 202 and its sub-modules may be performed by one or more computing systems implemented in a vehicle, such as the vehicle 640 of FIG. 6. In some embodiments, some or all of the functionality performed by the conditional priors module 202 and its sub-modules may be performed by one or more computing systems associated with (e.g., carried by) one or more users riding in a vehicle and/or participating in a ridesharing service, such as the computing device 630 of FIG. 6. In some embodiments, some or all of the functionality performed by the conditional priors module 202 and its sub-modules may be performed by one or more backend computing systems, such as a transportation management system 660 of FIG. 6. The components (e.g., modules, elements, etc.) shown in this figure and all figures herein are exemplary only, and other implementations may include additional, fewer, integrated, or different components. Some components may not be shown so as not to obscure relevant details. While discussion provided herein may reference autonomous vehicles as examples, the present technology can apply to any other type of vehicle, such as semi-autonomous vehicles.

In FIG. 2, the determination module 204 can be configured to analyze data to determine a likelihood of occurrence of a conditional prior. In general, a conditional prior can describe a known or predefined prior (e.g., pattern, activity, phenomenon, situation, behavior, etc.) that has a threshold likelihood of occurring when one or more conditions are satisfied. For example, a prior can be characterized as a likelihood or prediction of an object performing a behavior based on one or more conditions. The object may have a relationship or level of interaction with the one or more conditions. The one or more conditions can be referred to as an occurrence of an object and/or event that is based on a set of features. The set of features can include agents (e.g., pedestrians, vehicles, other static and dynamic objects, etc.); agent location, speed, angle, direction, and trajectory; geographic features (e.g., urban, suburb, rural, etc.); road features (e.g., intersection type, presence of intersection traffic control (e.g., stop sign, yield sign, etc.), presence of intersection pedestrian control, lane boundary type, type of lane use, lane width, roadway alignment, roadway classification, roadway features, roadway grade, roadway lane count, roadway parking, roadway zones, speed limit, roadway surface type, roadway traffic way type, and route-based intersection context information (e.g., U-turn, etc.)); a location (e.g., road, city, point of interest, etc.); a space (e.g., lane, bike lane, crosswalk, etc.); a time (e.g., date, day, time of day, time period, etc.); weather conditions (e.g., foggy, rain, snow, temperature, etc.); a transitory trigger (e.g., traffic control signal, object motion, etc.); or an autonomous vehicle operation (e.g., operations relating to perception, prediction, or planning), to name some examples. For example, a prior may be associated with flooding in road segments located in a rural area during rainy weather. In another example, a prior may be associated with vehicles appearing from a left-side of an intersection when a traffic control signal has a red light and from a right-side of the intersection when the traffic control signal has a green light. Another example prior may be associated with some activity (e.g., a parade, jaywalking in large groups, etc.) that occurs on certain days and times. In yet another example, a prior may be associated with an autonomous vehicle operation (e.g., a driving maneuver; sudden braking or acceleration; operations relating to perception, prediction, planning; etc.). For example, the prior may indicate that autonomous vehicles tend to brake suddenly when approaching a point of interest during foggy weather. In another example, the prior may indicate that autonomous vehicles tend to incorrectly change lanes when the vehicles are at some intersection. Many variations are possible.

In general, a conditional prior can be determined based on observations of object behavior in an environment by a fleet of vehicles (e.g., autonomous, semi-autonomous, or manually-driven vehicles). Further, the conditional prior can be associated with a likelihood of how the objects are expected to behave (e.g., interact, move, etc.) within the environment due to certain conditions being satisfied. The likelihood can be determined by analyzing previous observations of objects, such as objects that are similar and/or identical to the object, captured by vehicles (e.g., autonomous vehicles, human-driven vehicles) via sensor data. Thus, conditional priors provide likelihoods of how objects in an area are expected to behave when certain conditions associated with the area are satisfied. In some embodiments, the object is expected to behave according to a relationship and/or interaction between the object and one or more conditions being satisfied.

The determination module 204 can identify occurrence of such priors by analyzing data obtained from the data store 220. As mentioned, the data can include sensor data collected by sensors of a fleet of vehicles while navigating various environments. The fleet of vehicles can log information describing various observations that were made while navigating the environments based on captured sensor data. For example, the fleet of vehicles can log information describing features relating to an environment as discussed herein, including agents (e.g., static or dynamic objects) that were observed in the environment, agent types (e.g., vehicle, pedestrian, bicyclist, animal, debris, etc.), agent motion (e.g., speed, acceleration, angle, direction, trajectory, etc.), agent location, geographic features associated with the environment, road features associated with the environment, time, weather, and traffic signal states, to name some examples. The determination module 204 can analyze such information to determine occurrence of priors associated with the environment. Priors may be identified based on detection models trained to recognize pre-defined behavior in data. For example, the determination module 204 can apply detection models trained to recognize various priors, as illustrated in the example 300 of FIG. 3A. In FIG. 3A, a model 304 trained to detect occurrence of a prior associated with joggers in a bike lane can be applied to data obtained from the data store 220. The model 304 can identify a set of observations 308 associated with vehicles that were exposed to a group of joggers in a bike lane. The set of observations 308 can be evaluated to determine probabilities of encountering a group of joggers in a bike lane under different conditions, as discussed below. Alternatively, priors can be learned based on repeated exposure to certain types of behavior as determined based on data. For instance, the determination module 204 can apply various clustering algorithms to generate clusters of observations 306 based on shared features. The clusters 306 can represent different types of behavior to which vehicles were repeated exposed. For example, the set of observations 308 can be included in a cluster that represents different instances in which a vehicle was exposed to a group of joggers in the bike lane 116 while driving on the road 104. The set of observations 308 can be evaluated to determine probabilities of encountering a group of joggers in the bike lane 116 under different conditions, as discussed below. The determination module 204 can refine the clusters 306 at varying levels of granularity to determine priors of different scope. For example, pedestrians and vehicles may be associated with different priors depending on various features (e.g., their speed of travel, their location in relation to an ego vehicle, their distance from a sidewalk, etc.). The determination module 204 can consider some or all of these features when determining priors. Further, the refinement of clusters can also help discern between priors that occur in relation to a location (e.g., road, city, neighborhood, etc.) and priors that occur irrespective of location. Many variations are possible.

Figure 3B:
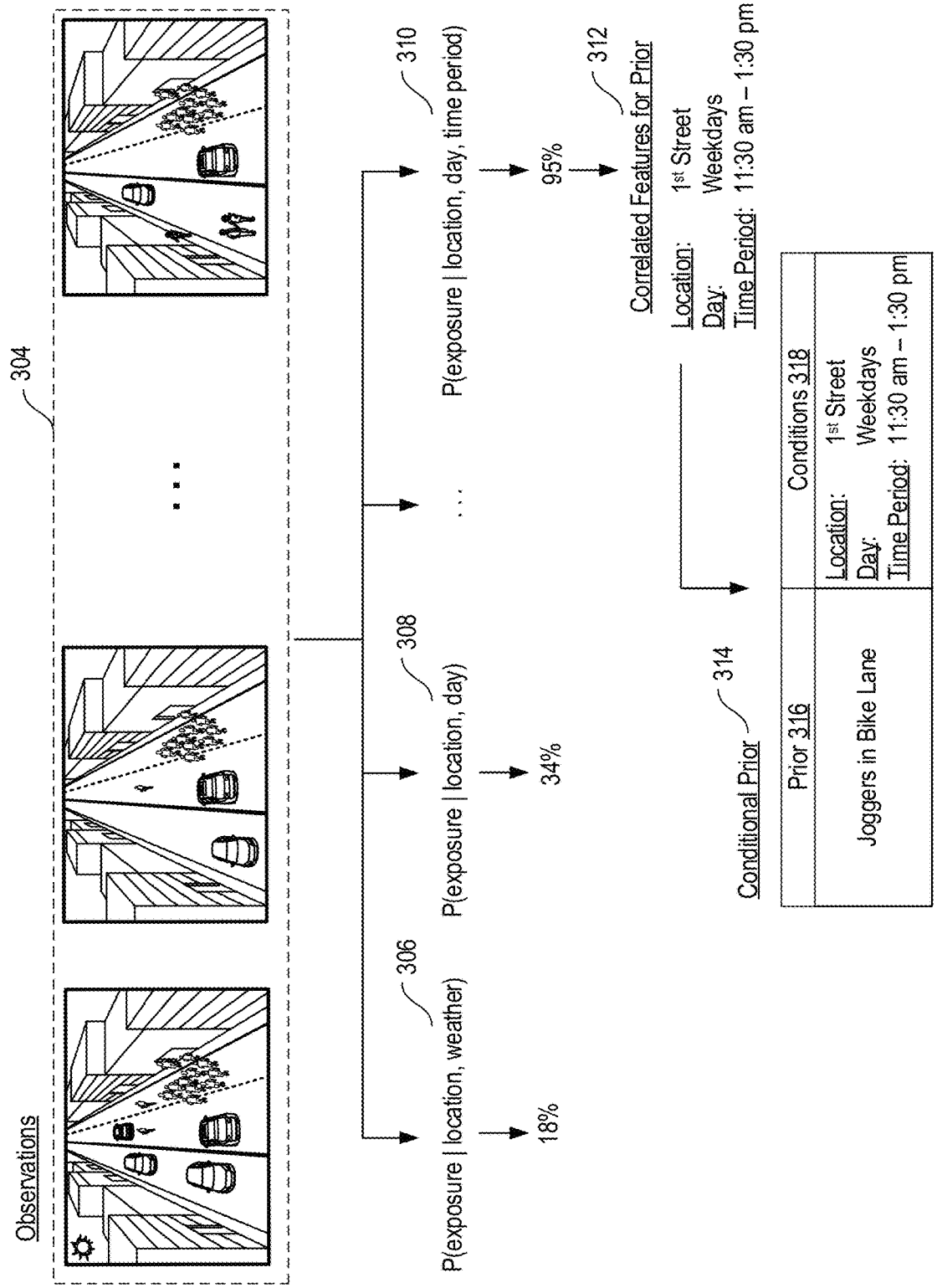

The determination module 204 can evaluate observations representing a prior to determine probabilities of encountering the prior under different conditions. For example, in FIG. 3A, the determination module 204 can evaluate the set of observations 308 to determine probabilities of encountering joggers in a bike lane under different conditions. In general, the determination module 204 can determine probabilities of encountering the prior based on the various features and combinations of features associated with the prior. For example, the determination module 204 can determine a probability 306 (e.g., 18%) of encountering the prior when navigating a particular location under certain weather conditions, as illustrated in FIG. 3B. In another example, the determination module 204 can determine a probability 308 (e.g., 34%) of encountering the prior when navigating the particular location on a particular day. In yet another example, the determination module 204 can determine a probability 310 (e.g., 95%) of encountering the prior at the particular location on weekdays and during a particular time period. Many variations are possible. Further, the determination module 204 can determine a best or highest (or threshold) probability of encountering the prior given some combination of features. In FIG. 3B, the determination module 204 determines, based on the probability 310, that a vehicle is most likely to encounter a group of joggers in a bike lane when the vehicle is navigating a particular location (e.g., 1$^{st}$ Street) on weekdays during a particular time period (e.g., 11:30 am to 1:30 pm). As a result, the determination module 204 can identify location, day, and time of day and their values as features 312 and feature values upon which occurrence of the prior is conditioned. The features 312 corresponding to location, day, and time, and associated values of the features, can be stored as conditions which, when satisfied, are associated with a threshold likelihood of encountering the prior. As shown in FIG. 3B, the determination module 204 can generate a conditional prior 314 based on the prior and the identified conditions. The conditional prior 314 can identify the prior 316 as well as conditions 318 associated with the prior 316.

Figure 3C:
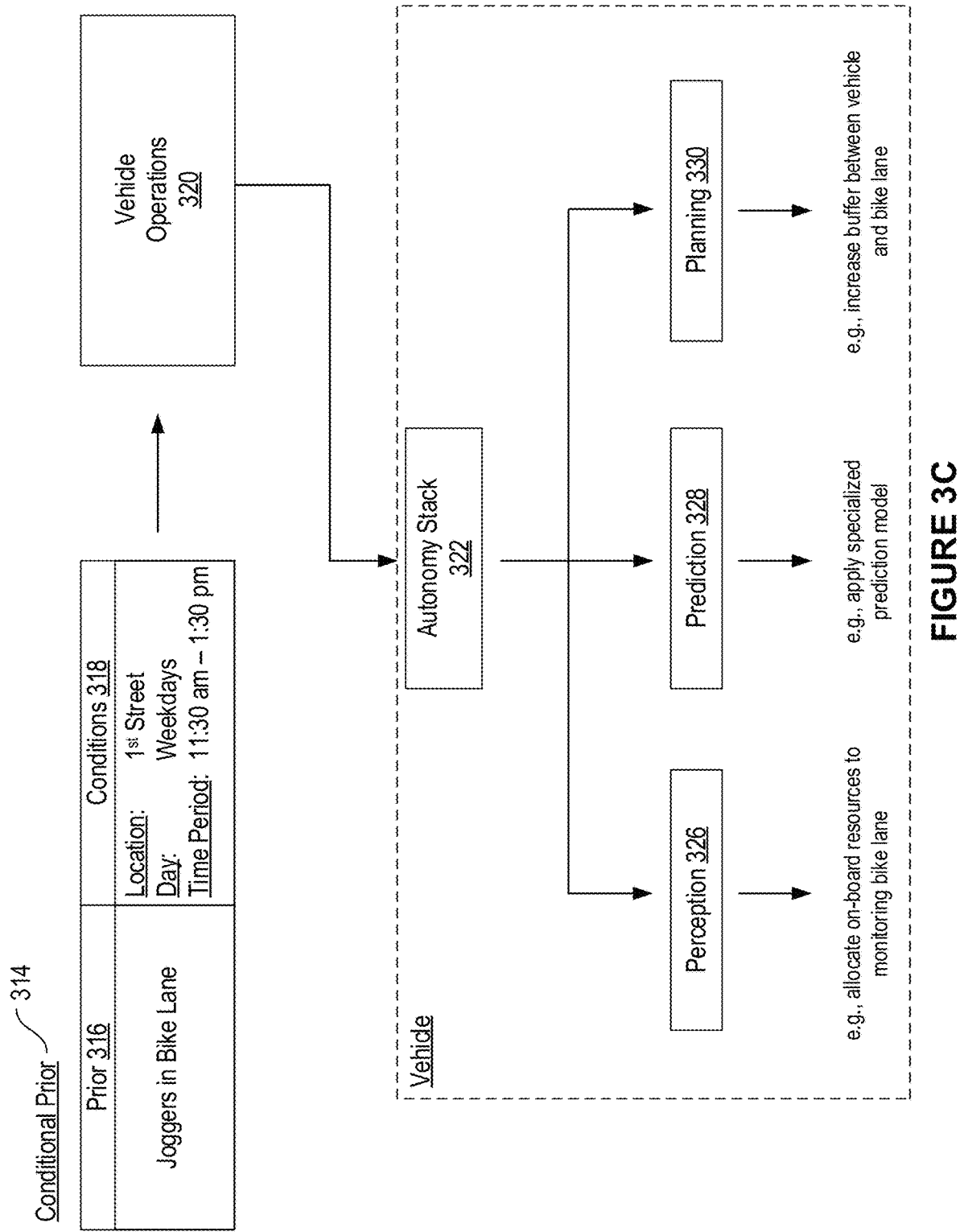

The application module 206 can be configured to use conditional priors identified by the determination module 204 for various applications. For example, the application module 206 can associate a conditional prior with one or more vehicle operations to be performed when conditions associated with the conditional prior are satisfied, as illustrated in the example of FIG. 3C. In FIG. 3C, vehicle operations 320 are associated with the conditional prior 314. The vehicle operations 320 may be machine-learned, rule based, or manually specified. For example, the vehicle operations 320 may be performed based on instructions provided by a computing system associated with an autonomous vehicle when conditions 318 associated with the conditional prior 314 are satisfied. In general, the vehicle operations 320 may include any operation that can be performed by an autonomous vehicle, such as performing a driving maneuver or activating a safety measure (e.g., turning on hazard lights).

In some embodiments, the application module 206 can associate a conditional prior with instructions for reconfiguring a general autonomy stack used by a computing system associated with an autonomous vehicle. For example, the general autonomy stack may be configured to perform default operations relating to perception, prediction, and planning, among others. In this example, instructions associated with vehicle operations to be performed in response to occurrence of a conditional prior can reconfigure the general autonomy stack to perform specialized perception, prediction, and planning operations when conditions associated with the conditional prior are satisfied.

For example, FIG. 3C illustrates an autonomy stack 322 which includes a perception component 326 that performs perception operations. In general, perception operations may involve operation of sensors (e.g., cameras, LiDAR, ultrasonic sensors, etc.) that allow a vehicle to perceive its environment. Perception operations may also involve application of perception models that allow the vehicle to perform perception-related tasks, such as identifying locations and types of objects in an environment. In some embodiments, the application module 206 can associate a conditional prior with a vehicle operation that instructs the perception component 326 to increase or decrease a range of perception of various sensors of a vehicle when conditions associated with the conditional prior are satisfied. For example, the vehicle operation can instruct the perception component 326 to increase a range of perception of a particular sensor to identify objects that are 30 yards away from a vehicle rather than applying a default range of perception of the sensor that only considers objects within 10 yards of the vehicle. In general, a vehicle operation associated with a conditional prior can be performed when conditions associated with the conditional prior are satisfied. However, there may be instances when not all of the conditions associated with the conditional prior are satisfied. In such instances, the vehicle operation associated with the conditional prior is not performed. Thus, in the foregoing example, when conditions associated with the conditional prior are not satisfied, then a determination can be made that there is no threshold likelihood of encountering the prior. As a result, the perception component 326 is not instructed to increase the range of perception of the particular sensor.

In some embodiments, the application module 206 can associate a conditional prior with a vehicle operation that instructs the perception component 326 to change (e.g., expand or focus) perception processing to include certain areas of interest when conditions associated with the conditional prior are satisfied. For example, the vehicle operation can instruct the perception component 326 to track agents located within a selected distance of an area of interest (e.g., crosswalks, jaywalker locations, etc.). In another example, the vehicle operation can instruct the perception component 326 to expand perception processing to focus on a bike path where bicyclists are likely to enter a roadway. Many variations are possible.

In some embodiments, the application module 206 can associate a conditional prior with a vehicle operation that instructs the perception component 326 to apply different perception models when conditions associated with the conditional prior are satisfied. For example, some perception models may be better suited for identifying locations and types of objects depending on various factors, such as different levels of lighting. Thus, in this example, the vehicle operation can instruct the perception component 326 to apply different perception models at different times of day. In another example, the vehicle operation can instruct the perception component 326 to apply a perception model to particular objects (e.g., pedestrians, bicyclists, etc.) at sunrise and a different perception model to those objects at sunset. Many variations are possible.

In some embodiments, the application module 206 can associate a conditional prior with a vehicle operation that instructs the perception component 326 to apply different parameters to a perception model when conditions associated with the conditional prior are satisfied. For example, the perception model may be configured according to a set of model parameters, e.g., weights or the like determined in a training process. The perception model may be reconfigured for use under different circumstances by loading a special set of model parameters. For example, a special set of model parameters may be loaded when the perception model is applied in a particular region during inclement weather. Many variations are possible.

In some embodiments, the application module 206 can associate a conditional prior with a vehicle operation that instructs the perception component 326 to apply different classification models when conditions associated with the conditional prior are satisfied. For example, a classification model tuned for identifying pedestrians can be applied in a region where pedestrians are present 90% of time. In another example, a classification model tuned for identifying bicyclists can be applied to a street where bicyclists have a threshold likelihood of appearing. Many variations are possible.

In some embodiments, the application module 206 can associate a conditional prior with a vehicle operation that instructs the perception component 326 to alter or reallocate on-board resources (e.g., sensors) that support the perception component 326 when conditions associated with the conditional prior are satisfied. For example, the vehicle operation can instruct the perception component 326 to activate or deactivate certain sensors (e.g., cameras, LiDAR, ultrasonic sensors, etc.) in response to a determination of the occurrence of a conditional prior. For example, additional cameras can be activated on streets that include a bike lane when occurrence of a conditional prior associated with a street having a bike lane is determined. In another example, the vehicle operation can instruct the perception component 326 to focus perception on a particular location or area in response to a determination of occurrence of an associated conditional prior. Many variations are possible.

The autonomy stack 322 can also include a prediction component 328 that performs prediction operations. Prediction operations may involve application of prediction models that can predict future locations or movement (e.g., trajectories) of objects detected in an environment. For example, some prediction models may be better suited for predicting future locations or movement of certain types of objects in certain situations. In this regard, a first prediction model may better predict a trajectory of a first type of object while a second prediction model may better predict a trajectory of a second type of object. Or, a third prediction model may better predict a trajectory of a third type of object in a first situation while a fourth prediction model may better predict a trajectory of the third type of object in a second situation. For example, a generalized prediction model may be unable to predict trajectories of pedestrians located in a driving lane, or may predict partially incorrect (e.g., correct direction but wrong speed) or completely incorrect (e.g., wrong direction and wrong speed) trajectories for the pedestrians. These different predictions may be partially or completely incorrect, and may result in less-efficient or incorrect vehicle operations.

In some embodiments, rather than applying a generalized prediction model, the application module 206 can associate a conditional prior with a vehicle operation that instructs the prediction component 328 to apply specialized prediction models when conditions associated with the conditional prior are satisfied. For example, in response to a determination of occurrence of a related conditional prior, the vehicle operation can instruct the prediction component 328 to apply a specialized prediction model for predicting bicyclist trajectories when evaluating agents present in a bike lane. In another example, the vehicle operation can instruct the prediction component 328 to apply one prediction model when evaluating agent behavior near an intersection and a different prediction model evaluating agent behavior near a point of interest (e.g., a park, school, hospital, etc.). Many variations are possible.

The autonomy stack 322 can also include a planning component 330 that performs planning operations. Planning operations may involve application of planning models that may perform planning-related tasks, such as determining paths for a vehicle to follow. A planning model may identify a set of potential driving maneuvers or trajectories a vehicle can take in an environment, and may also identify corresponding likelihoods that each trajectory should be performed. The planning component 330 may select one of the trajectories for use, e.g., the trajectory having the highest likelihood. The planning model may identify these potential trajectories and their likelihoods based on, for example, the perception component 326 and the prediction component 328 of the autonomy stack 322.

The application module 206 can associate conditional priors with vehicle operations that can be performed based on the planning component 330. In some embodiments, the application module 206 can associate a conditional prior with a vehicle operation that instructs the planning component 330 to provide a specific path for a vehicle when conditions associated with the conditional prior are satisfied. For example, the vehicle operation can instruct the planning component 330 to provide a vehicle path that avoids potholes on a road. In some embodiments, the application module 206 can associate a conditional prior with a vehicle operation that instructs the planning component 330 to perform a driving maneuver when conditions associated with the conditional prior are satisfied. For example, the vehicle operation can instruct the planning component 330 to initiate a lane change. In another example, the vehicle operation can instruct the planning component 330 to increase or decrease lateral movement. For example, the vehicle operation can instruct the planning component 330 to increase a lateral distance between a vehicle and a bike lane. In some embodiments, the application module 206 can associate a conditional prior with a vehicle operation that instructs the planning component 330 to adjust vehicle speed, angle, direction, or trajectory when conditions associated with the conditional prior are satisfied. For example, the vehicle operation can instruct the planning component 330 to adjust vehicle speed to drive 10 miles per hour below a posted speed limit when navigating a region during some time period. In some embodiments, the application module 206 can associate a conditional prior with a vehicle operation that instructs the planning component 330 to apply a particular driving mode when conditions associated with the conditional prior are satisfied. For example, the vehicle operation can instruct the planning component 330 to apply a cautious driving mode near schools. In contrast, the vehicle operation can instruct the planning component 330 to apply an aggressive driving mode on highways during rush hour. Many variations are possible.

The application module 206 can also be configured to generate and distribute semantic maps that encode information describing conditional priors. For example, a semantic map may correspond to a region. The semantic map may include various layers of information. For example, the semantic map may include a road graph layer that provides information describing road segments (e.g., interconnections, number of lanes, directions of travel, etc.). As another example, the semantic map can also include a lane geometry layer that provides information describing lane geometry (e.g., lane markings, street-level rules, color of lines, areas that allow lane changes, speed bumps, stop signs, etc.). In some embodiments, the application module 206 can generate for the semantic map a priors layer that encodes information describing conditional priors. An autonomous vehicle can use the semantic map to identify and use conditional priors when navigating the region. For example, when conditions associated with a conditional prior are satisfied, an autonomous vehicle can reconfigure its autonomy stack to perform vehicle operations associated with the conditional prior, as discussed. As a result, the autonomous vehicle can anticipate priors that have a high probability of occurring given a set of conditions and can proactively take measures in anticipation of those priors. The application module 206 can continuously update and distribute the semantic map as additional data is collected and analyzed. For example, the application module 206 can update the semantic map to include new conditional priors that were determined based on sensor data collected by a fleet of vehicles. The application module 206 can also distribute the semantic map to the fleet of vehicles over one or more networks.

Figure 3D:
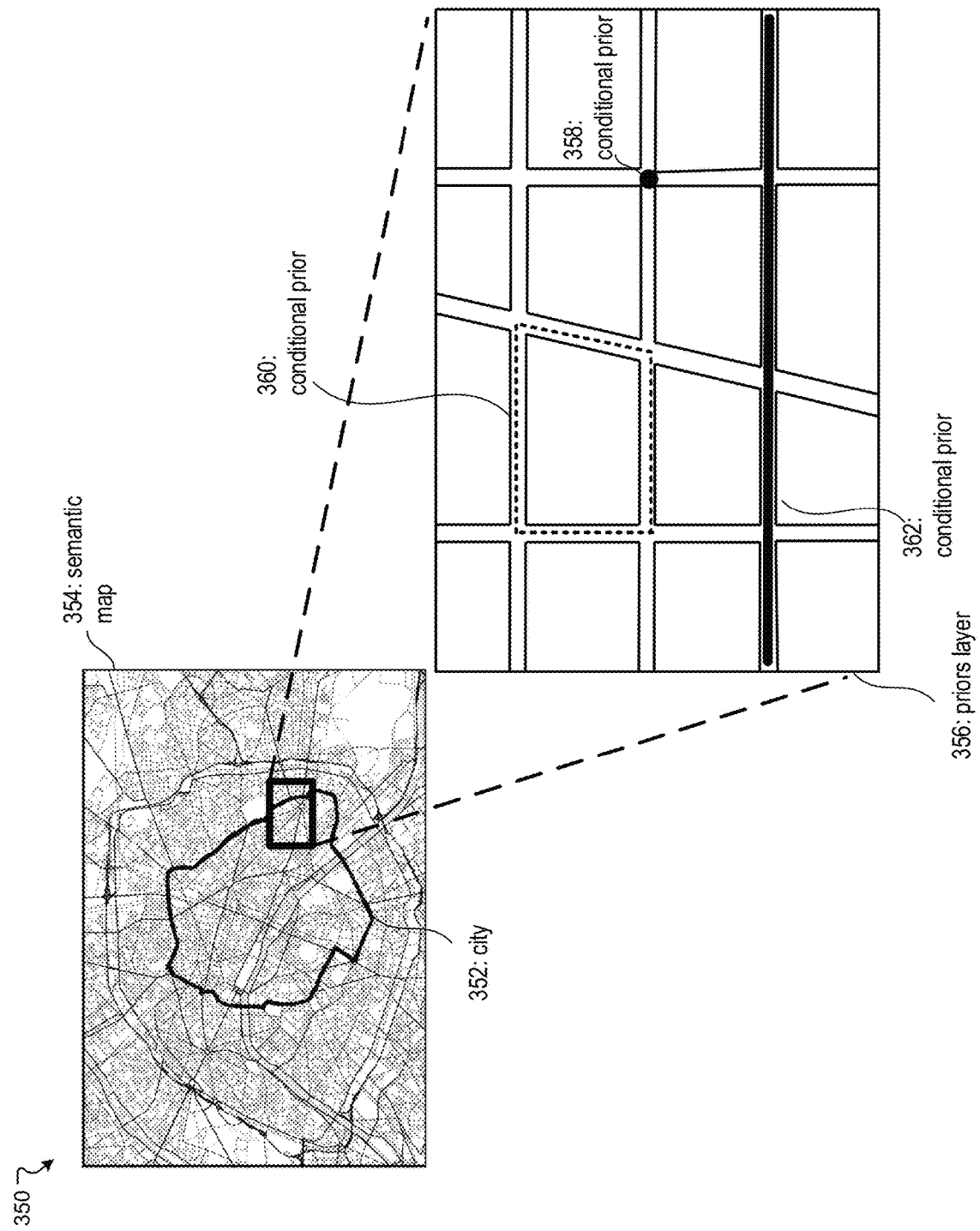

FIG. 3D illustrates an example 350 of a semantic map 354 that corresponds to a city 352. FIG. 3D also illustrates a portion of a priors layer 356 associated with the semantic map 354. The priors layer 356 provides information describing conditional priors that have been determined for a region within the city 352. For example, the priors layer 356 identifies an intersection that is associated with a conditional prior 358. For example, the conditional prior 358 can indicate a threshold likelihood of encountering vehicles that fail to stop at a stop sign associated with the intersection when certain related conditions are satisfied. The conditional prior 358 can also be associated with vehicle operations that can reconfigure an autonomy stack associated with an autonomous vehicle navigating the intersection, as described above. In another example, the priors layer 356 includes a polygon identifying a region around a building that is associated with a conditional prior 360. For example, the conditional prior 360 can indicate a threshold likelihood of encountering pedestrians in wheelchairs around the building at certain times of day. The conditional prior 360 can also be associated with vehicle operations that can reconfigure an autonomy stack of an autonomous vehicle driving near the building, as described above. In yet another example, the priors layer 356 identifies a street that is associated with a conditional prior 362. For example, the conditional prior 362 can indicate a threshold likelihood of encountering jaywalkers on the street when a bus with flashing lights is present during a particular time period (e.g., weekdays between 2-4 pm). The conditional prior 362 can also be associated with vehicle operations that can reconfigure an autonomy stack of an autonomous vehicle navigating the street, as described above. Many variations are possible.

Figure 4:
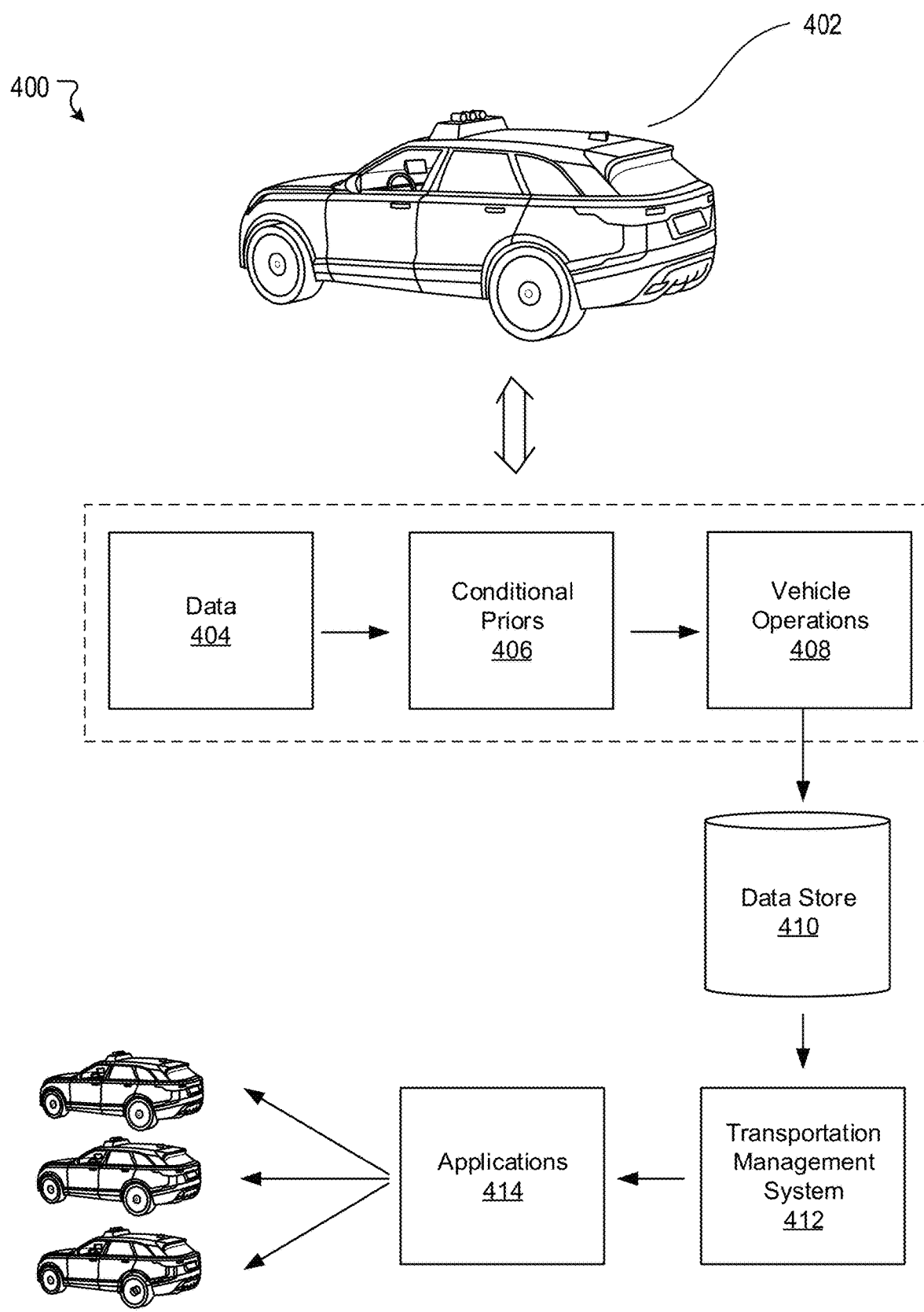
FIG. 4 illustrates an example diagram of an approach for interpreting environmental information to identify conditional priors and applying those conditional priors for various applications, according to an embodiment of the present technology.
Figure 6:
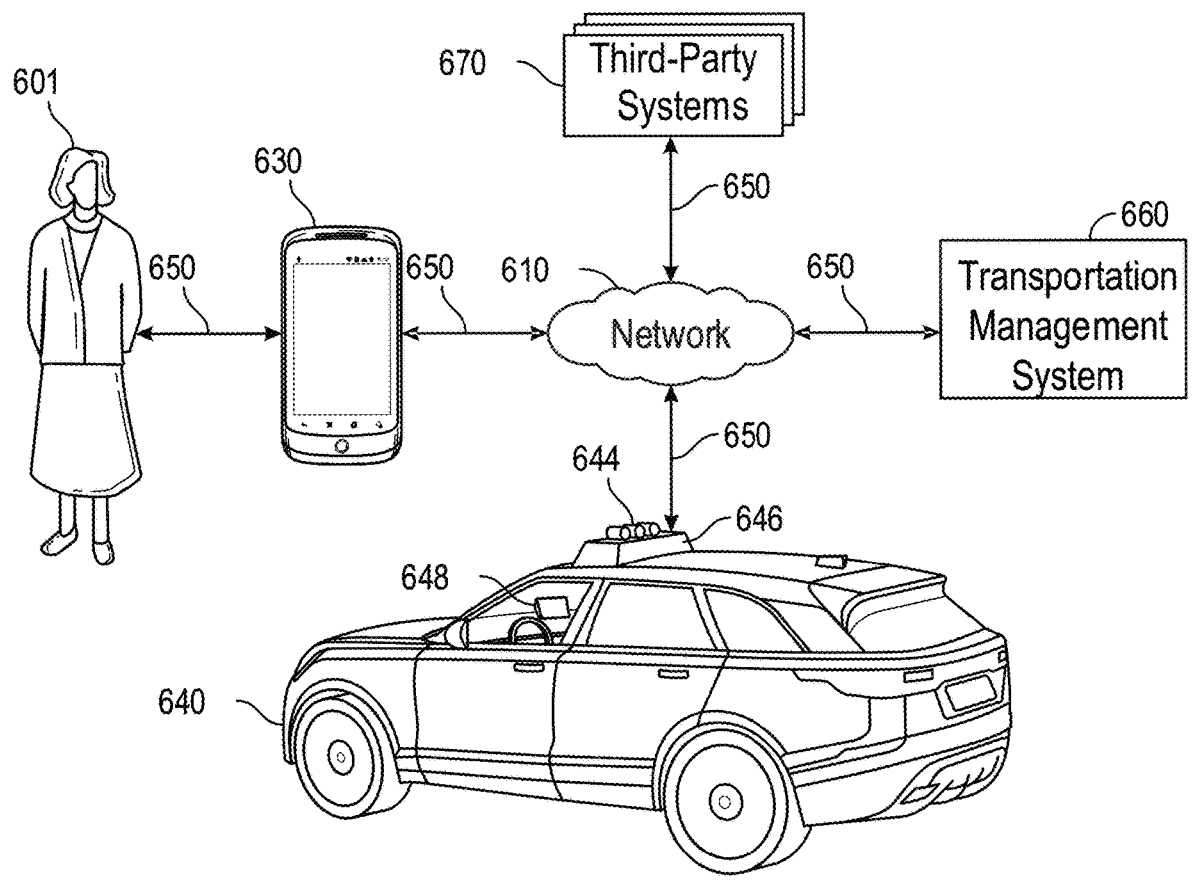
FIG. 6 illustrates an example block diagram of a transportation management environment, according to an embodiment of the present technology.

FIG. 4 illustrates an example diagram 400 of an approach for determining and utilizing conditional priors based on the conditional priors module 202, according to an embodiment of the present technology. In this example, the approach can be implemented by a vehicle 402. The vehicle 402 can be, for example, the vehicle 640 as shown in FIG. 6. For example, at block 404, sensor data captured by sensors in the vehicle 402 while navigating an environment can be obtained. At block 406, the sensor data can be analyzed to identify occurrence of conditional priors, as described above. The prior can be associated with at least a threshold likelihood of being encountered when a set of conditions are satisfied. At block 408, vehicle operations for the conditional prior are determined, as described above. For example, the vehicle operations can be performed when the set of conditions associated with the conditional prior are satisfied. In various embodiments, information describing conditional priors can be stored in a data store 410. For example, information describing a conditional prior can be associated with a prior, a set of features that characterize the prior, one or more conditions, and one or more vehicular operations to be performed when the one or more conditions are satisfied. Information describing conditional priors can be accessed by a transportation management system 412 (e.g., the transportation management system 660 of FIG. 6). For example, the information can be stored in a data store 410. In various embodiments, the information can be used by the transportation management system 412 for various applications 414, such as generating a semantic map that encodes conditional priors associated with a region (e.g., road, neighborhood, zone, city, etc.), as described above. The generated semantic map can be distributed to a vehicle or a fleet of vehicles, for example, over one or more wired or wireless networks. Many variations are possible.

Figure 5:
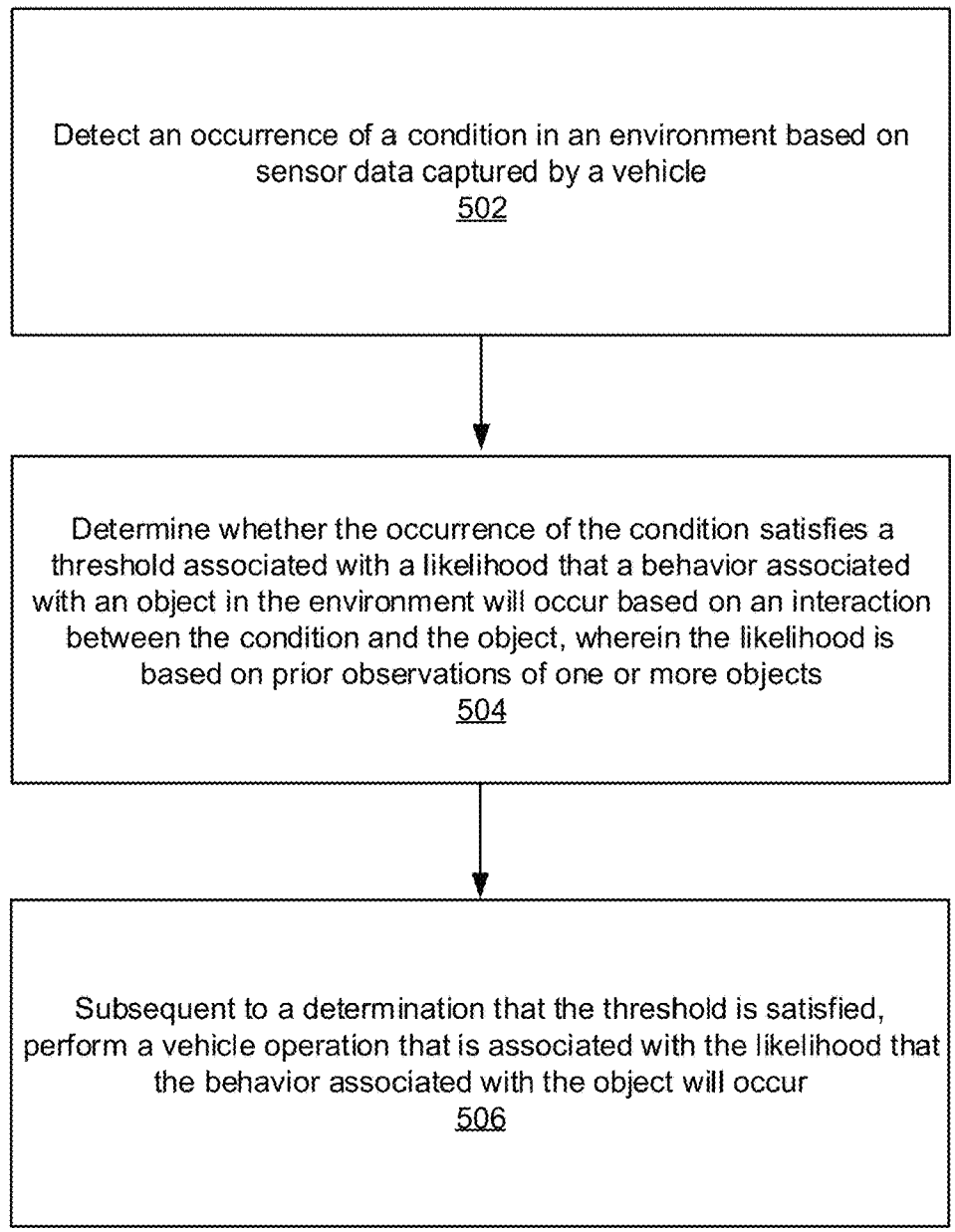
FIG. 5 illustrates an example method, according to an embodiment of the present technology.

FIG. 5 illustrates an example method 500, according to an embodiment of the present technology. At block 502, the example method 500 can detect an occurrence of a condition in an environment based on sensor data captured by a vehicle. At block 504, a determination is made whether the occurrence of the condition satisfies a threshold associated with a likelihood that a behavior associated with an object in the environment will occur based on an interaction between the condition and the object, wherein the likelihood is based on prior observations of one or more objects. At block 506, subsequent to determining that the threshold is satisfied, a vehicle operation that is associated with the likelihood that the behavior associated with the object will occur is performed. Many variations to the example method are possible. It should be appreciated that there can be additional, fewer, or alternative steps performed in similar or alternative orders, or in parallel, within the scope of the various embodiments discussed herein unless otherwise stated.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules shown in FIG. 2 may be implemented by one or more computing systems of the transportation management system 660. In some embodiments, some or all modules shown in FIG. 2 may be implemented by one or more computing systems in the vehicle 640. In some embodiments, some or all modules shown in FIG. 2 may be implemented by the user device 630.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, California, the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
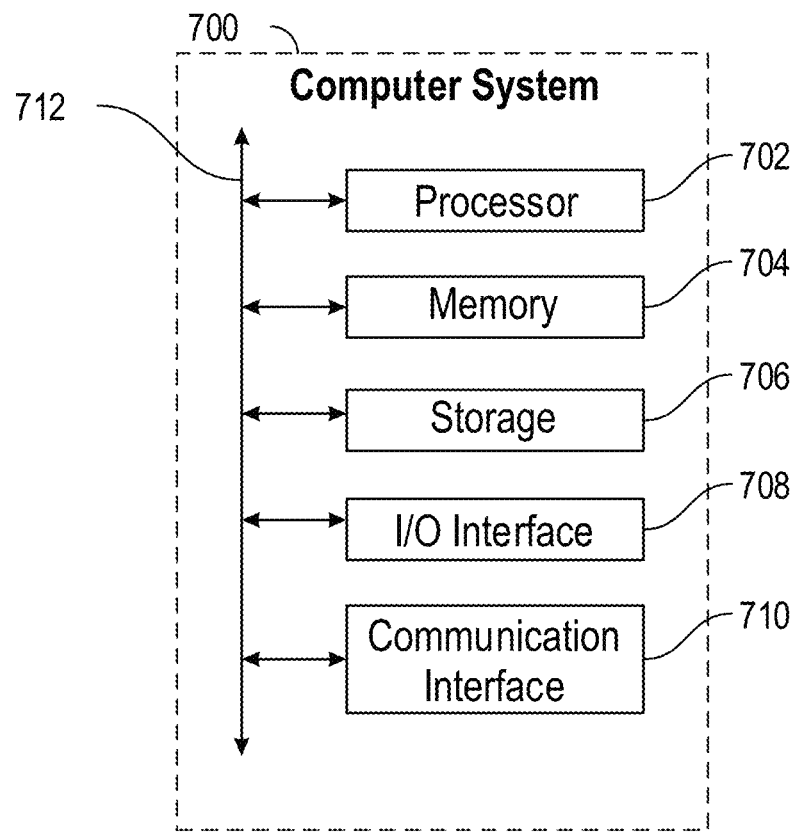
FIG. 7 illustrates an example of a computer system or computing device that can be utilized, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   detecting, by a computing system, an occurrence of a condition associated with a first object in an environment based on sensor data captured by a vehicle;
   determining, by the computing system, whether the occurrence of the condition satisfies a threshold associated with a likelihood that a behavior associated with a second object in the environment will occur in response to the occurrence of the condition associated with the first object, wherein the likelihood is based on prior observations of one or more objects and an interaction between the condition and the second object;
   subsequent to determining that the threshold is satisfied, reconfiguring, by the computing system, a perception component of an autonomy stack associated with the vehicle, wherein the reconfiguring comprises adjusting at least one of parameters, detection range, or focus areas of the perception component for observing the occurrence of the behavior associated with the second object; and
   performing, by the computing system, a vehicle operation to guide the vehicle to avoid collision with the second object, wherein the vehicle operation is associated with the likelihood that the behavior associated with the second object will occur and data collected by the reconfigured perception component.

2. The computer-implemented method of claim 1, wherein determining whether the occurrence of the condition satisfies the threshold comprises:
   referencing, by the computing system, a semantic map associated with the environment, wherein the semantic map includes at least a priors layer that encodes information describing the condition and the likelihood that the behavior associated with the second object will occur, and
   the semantic map is continuously updated based on new data collected by a fleet of vehicles.

3. The computer-implemented method of claim 1, wherein the condition corresponds to an occurrence of an event associated with the first object in the environment, and wherein the occurrence of the at least one object or event within the environment is associated with the likelihood that the behavior associated with the second object will occur.

4. The computer-implemented method of claim 1, wherein reconfiguring the perception component causes the perception component to at least one of increase or decrease a range of perception for sensors associated with the vehicle, expand perception processing to focus on an area of interest, change a perception model implemented by the perception component, change model parameters for a perception model implemented by the perception component, change an object classification model implemented by the perception component, activate or deactivate one or more sensors, or reallocate on-board resources associated with the perception component.

5. The computer-implemented method of claim 1, wherein performing the vehicle operation comprises:
   reconfiguring, by the computing system, a prediction component of the autonomy stack associated with the vehicle, wherein reconfiguring the prediction component changes at least one operation performed by the prediction component with respect to the second object in the environment based on the likelihood that the behavior associated with the second object will occur.

6. The computer-implemented method of claim 5, wherein reconfiguring the prediction component causes the prediction component to apply a specialized prediction model to predict a location and movement of the second object instead of a generalized prediction model.

7. The computer-implemented method of claim 1, wherein performing the vehicle operation comprises:
   reconfiguring, by the computing system, a planning component of the autonomy stack associated with the vehicle, wherein reconfiguring the planning component changes at least one trajectory to be performed by the planning component based on the likelihood that the behavior associated with the second object will occur.

8. The computer-implemented method of claim 1, further comprising:
   determining, by the computing system, a plurality of probabilities that the behavior associated with the second object in the environment will occur based on an interaction between the second object and a plurality of conditions, including the condition associated with the first object; and
   determining, by the computing system, the likelihood that the behavior associated with the second object will occur based on an interaction between the condition and the second object based on a highest probability from the plurality of probabilities.

9. The computer-implemented method of claim 1, wherein the prior observations of the one or more objects are captured by sensors of one or more vehicles that navigated the environment, and wherein the second object is at least similar to the one or more objects, and a prior observation is associated with an interaction between the one or more objects and at least the condition.

10. A system comprising:
at least one processor; and
a memory storing instructions that, when executed by the at least one processor, cause the system to perform operations comprising:
detecting an occurrence of a condition associated with a first object in an environment based on sensor data captured by a vehicle;
determining whether the occurrence of the condition satisfies a threshold associated with a likelihood that a behavior associated with a second object in the environment will occur in response to the occurrence of the condition associated with the first object, wherein the likelihood is based on prior observations of one or more objects and an interaction between the condition and the second object;
subsequent to determining that the threshold is satisfied, reconfiguring a perception component of an autonomy stack associated with the vehicle, wherein the reconfiguring comprises adjusting at least one of parameters, detection range, or focus areas of the perception component for observing the occurrence of the behavior associated with the second object; and
performing a vehicle operation to guide the vehicle to avoid collision with the second object, wherein the vehicle operation is associated with the likelihood that the behavior associated with the second object will occur and data collected by the reconfigured perception component.

11. The system of claim 10, wherein determining whether the occurrence of the condition satisfies the threshold comprises:
referencing a semantic map associated with the environment, wherein the semantic map includes at least a priors layer that encodes information describing the condition and the likelihood that the behavior associated with the second object will occur, and
the semantic map is continuously updated based on new data collected by a fleet of vehicles.

12. The system of claim 10, wherein the condition corresponds to an occurrence of an event associated with the first object in the environment, and wherein the occurrence of the event is associated with the likelihood that the behavior associated with the second object will occur.

13. The system of claim 11, wherein reconfiguring the perception component causes the perception component to at least one of increase or decrease a range of perception for sensors associated with the vehicle, expand perception processing to focus on an area of interest, change a perception model implemented by the perception component, change model parameters for a perception model implemented by the perception component, change an object classification model implemented by the perception component, activate or deactivate one or more sensors, or reallocate on-board resources associated with the perception component.

14. A non-transitory computer-readable storage medium including instructions that, when executed by at least one processor of a computing system, cause the computing system to perform operations comprising:
detecting an occurrence of a condition associated with a first object in an environment based on sensor data captured by a vehicle;
determining whether the occurrence of the condition satisfies a threshold associated with a likelihood that a behavior associated with a second object in the environment will occur in response to the occurrence of the condition associated with the first object, wherein the likelihood is based on prior observations of one or more objects and an interaction between the condition and the second object;
subsequent to determining that the threshold is satisfied, reconfiguring a perception component of an autonomy stack associated with the vehicle, wherein the reconfiguring comprises adjusting at least one of parameters, detection range, or focus areas of the perception component for observing the occurrence of the behavior associated with the second object; and
performing a vehicle operation to guide the vehicle to avoid collision with the second object, wherein the vehicle operation is associated with the likelihood that the behavior associated with the second object will occur and data collected by the reconfigured perception component.

15. The non-transitory computer-readable storage medium of claim 14, wherein determining whether the occurrence of the condition satisfies the threshold comprises:
referencing a semantic map associated with the environment, wherein the semantic map includes at least a priors layer that encodes information describing the condition and the likelihood that the behavior associated with the second object will occur, and
the semantic map is continuously updated based on new data collected by a fleet of vehicles.

16. The non-transitory computer-readable storage medium of claim 14, wherein reconfiguring the perception component causes the perception component to at least one of increase or decrease a range of perception for sensors associated with the vehicle, expand perception processing to focus on an area of interest, change a perception model implemented by the perception component, change model parameters for a perception model implemented by the perception component, change an object classification model implemented by the perception component, activate or deactivate one or more sensors, or reallocate on-board resources associated with the perception component.

17. The method of claim 1, wherein detecting the occurrence of the condition associated with the first object in the environment comprises:
obtaining sensor data collected by sensors of a fleet of vehicles including the vehicle while navigating the environment; and
identifying the occurrence of the condition associated with the first object based on detection models trained to recognize pre-defined behavior in the obtained sensor data.

18. The method of claim 1, wherein the vehicle operation comprises adjusting the lateral distance of the vehicle from a designated area in the environment based on the data collected by the reconfigured perception component.

* * * * *